June 19, 1956 J. S. BAER 2,751,438

MAGNETIC RECORDING APPARATUS

Filed March 30, 1955 3 Sheets-Sheet 1

INVENTOR.
John S. Baer
BY Morris L. Rabkin
ATTORNEY

June 19, 1956 J. S. BAER 2,751,438

MAGNETIC RECORDING APPARATUS

Filed March 30, 1955 3 Sheets-Sheet 2

INVENTOR.

John S. Baer

BY Morris A. Rabkin

ATTORNEY

MAGNETIC RECORDING APPARATUS

Filed March 30, 1955 3 Sheets-Sheet 3

INVENTOR.
John S. Baer
BY
Morris A. Rabkin
ATTORNEY

United States Patent Office 2,751,438

Patented June 19, 1956

2,751,438

MAGNETIC RECORDING APPARATUS

John S. Baer, Woodbury, N. J., assignor to Radio Corporation of America, a corporation of Delaware Application March 30, 1955, Serial No. 497,839

10 Claims. (Cl. 179—100.2)

This invention relates to magnetic recording-reproducing apparatus, and more particularly to improved magnetic recording-reproducing apparatus in the form of a machine characterized by features which provide for convenient and simplified operation. The convenience and simplicity of apparatus embodying the present invention makes it especially suitable for use as a home instrument.

It is an object of the present invention to provide an improved magnetic recording-reproducing machine which is characterized by ease of operation.

It is another object of this invention to provide magnetic recording-reproducing apparatus as set forth which is of simple and economical construction.

A further object of this invention is to provide a single instrumentality for controlling operation of the mechanism and electrical connection in magnetic recording-reproducing apparatus.

In accomplishing these and other objects, there has been provided in accordance with the present invention a magnetic recording-reproducing machine wherein a single control instrumentality is arranged to control all operations involving the magnetic record transport mechanism, the engagement and disengagement of the recording-reproducing transducer with the tape and the electrical connections to the recording and reproducing amplifiers. The control instrumentality may, for example, be a convenient knob.

A better understanding of the present invention may be had from the following detailed description when read in connection with the accompanying drawing in which.

Figure 1:
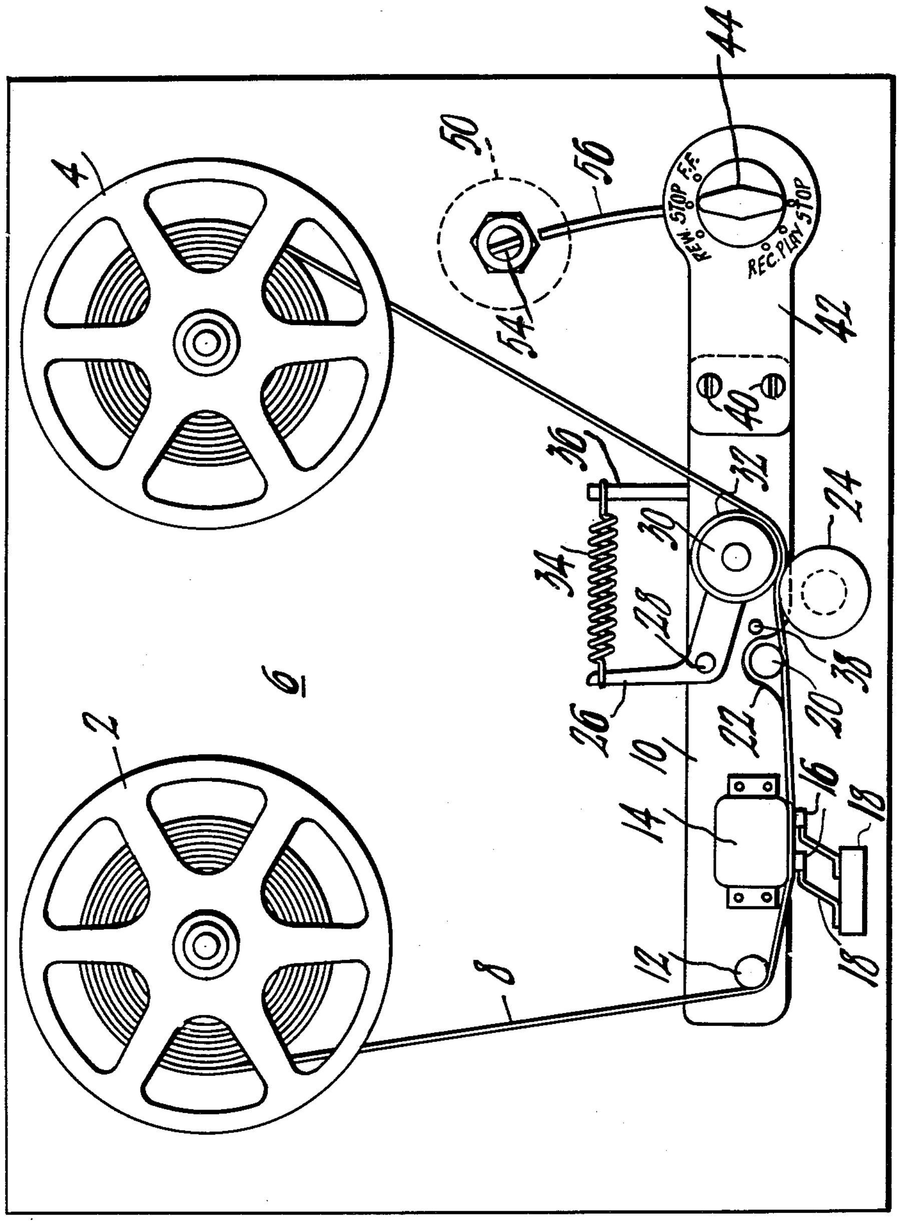
Fig. 1 is a plan view of a magnetic recording-reproducing apparatus constructed in accordance with the present invention and shown with the record member engaged by the transducer unit.
Figure 2:
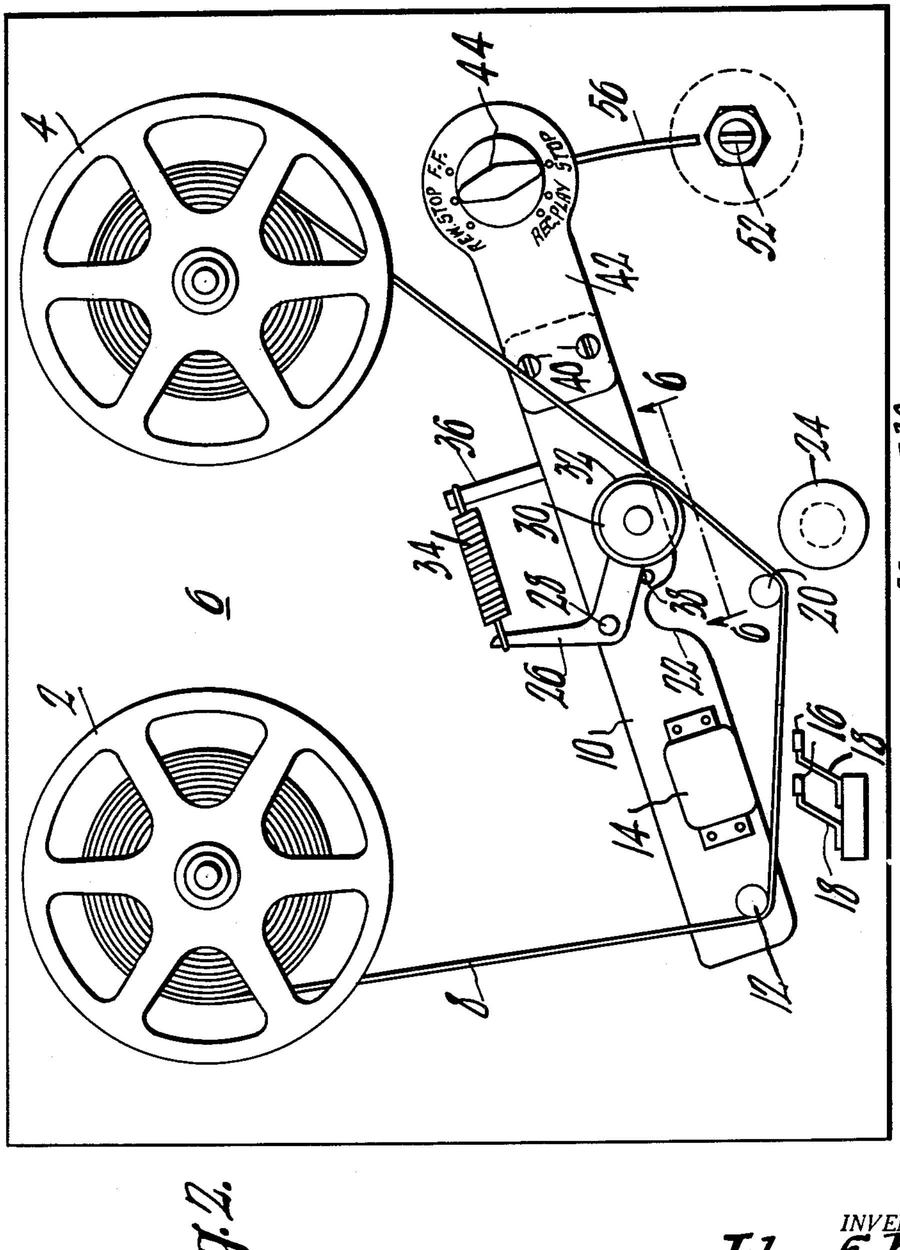
Fig. 2 is a view similar to Fig. 1 but showing the apparatus with the transducer unit disengaged from the record member.

Referring now to the drawings in more detail, it may be seen, in Figs. 1 and 2, that there has been provided a tape recording mechanism in which a supply reel 2 and a takeup reel 4 are mounted in side-by-side relation on a mounting panel 6. In operation, a magnetic record tape member 8 travels between these two reels. Also mounted on the panel 6 is a main control member or operating arm 10. This arm 10 is pivotally mounted to swing about the pivot member 12. The pivot member 12 is extended above the surface of the arm 10 to constitute a guide post for the tape. Next, adjacent to the guide post 12 and on the arm 10, there is positioned a magnetic record transducer unit 14. This unit 14 may be of the type wherein two head elements are mounted in the single unit, one head element being an erasing head, the other being a recording-reproducing head. A pair of pressure pad members 16 are mounted on spring arms 18 and positioned adjacent the main arm 10 to press the record tape member 8 against the transducer unit 14 when the main arm 10 is in the "transducing" position shown in Fig. 1. These pressure pad members 16 may suitably comprise small pads of felt cemented to the ends of the leaf spring arms 18.

The tape next engages a second guide post 20 which extends from the mounting panel 6 through a notch 22 in the main arm 10 to a position sufficiently above the surface of the arm to fully engage the tape record member 8. Adjacent to the guide post 22 and to the arm 10, there is positioned a capstan 24 which will be more fully described hereinafter.

Figure 6:
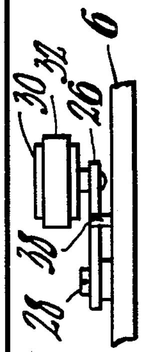
Fig. 6 is a fragmentary view taken along the line 6—6 of Fig. 2 as viewed in the direction of the arrows.

Mounted on the main arm 10, there is positioned a bell crank 26 which is pivoted about a pivot member 28. Carried by one arm of the bell crank 26 is a pressure roller 30 which may include a resilient tire of material such as rubber. This structure is shown in elevation in Fig. 6. A spring 34 extends from the other arm of the bell crank to a fixed post 36. The springs tend to rotate the bell crank in a clockwise direction around the pivot member 28. When the main arm 10 is in the "transducing" position shown in Fig. 1, this operation of the pressure roller and bell crank assembly causes the tape record member to be resiliently pressed against the capstan by the pressure roller 30 as urged by the spring 34. A limiting post 38 is positioned adjacent the arm of the bell crank to limit the amount of clockwise rotation when the main arm is in the "fast driving" position shown in Fig. 2.

To the end of the arm 10 there is secured, by means of screws 40 or the like, an operating handle 42. The operating handle includes an operating member or knob 44 which extends above the surface of the handle for ready access by an operator and a switch actuating member in the form of a bifurcated key 46 which extends below the handle 42 and is more clearly shown in Figs. 3, 4, and 5.

Figure 3:
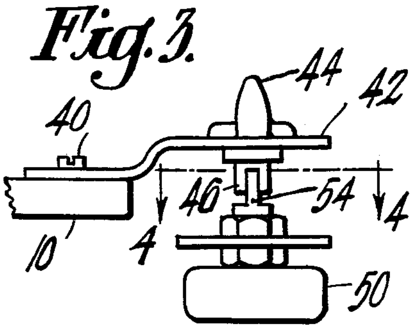
Fig. 3 is a detailed fragmentary view in elevation of the single control knob in its relationship with one of the control switches.
Figure 4:
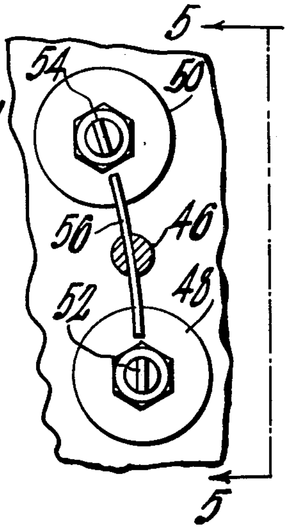
Fig. 4 is a view, partly in section taken along the line 4—4 of Fig. 3 as viewed in the direction of the arrows.
Figure 5:
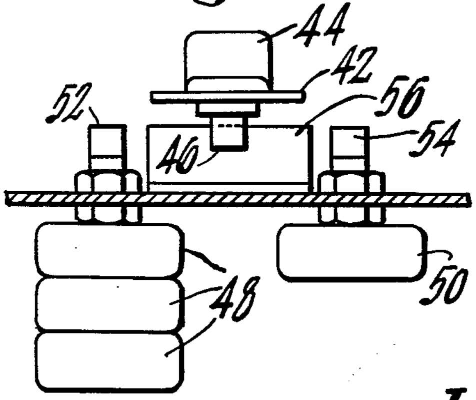
Fig. 5 is a view, partly in cross section, taken along the line 5—5 of Fig. 4 as viewed in the direction of the arrows.

In Figs. 3, 4, and 5, it may be seen that the bifurcated key 46 is positioned to engage either of two switches 48 and 50. The switch 48 may be a three-deck rotary switch with a movable contact and four fixed contacts. The switch 50 may be a single deck switch of the same type. These switches are secured to the mounting panel 6 with an operating tang 52 and 54, respectively, extending upwardly toward the bifurcated key 46. Between the two switches and secured to the upper surface of the mounting panel 6 there is an arcuate guide rib 56. This rib serves to guide the bifurcated key 46 from one switch tang to the other. It also provides means for preventing the knob and hence the key from being turned while it is in a position intermediate the two switches. Such turning of the knob would obviously prevent the key from matching up with the tang of either of the switches when the arm is moved to one or the other of the switching positions. The guide rib further assures that the switches will be left in a condition whereat the tang constitutes a continuation of the rib whenever the operating arm is being moved from engagement therewith.

As may be noted with reference to Fig. 1 or 2, the operating handle 42 carries index markings to indicate the several functions which may be set into operation by the actuation of the operating knob 44. Thus when the arm 10 is in the "transducing" position shown in Fig. 1, the indicia of the lower side of the operating handle show that actuation of the operating knob 44 can condition the machine to record, to reproduce or play back, or stop. The stop position coincides with the position of the switch 48 wherein the tang 52 is aligned with the rib member 56. Thus before the arm can be moved into or out of engagement with the switch 48, the switch must be positioned in the stop condition. When the arm is in the upper position, the indicia on the upper side of the operating handle 42 shows that the machine may be conditioned for fast forward or fast rewind operations or conditioned to be stopped. Again, the stop position corresponds to the position of the switch 52 when the tank 54 is aligned with the rib 56.

Figure 7:
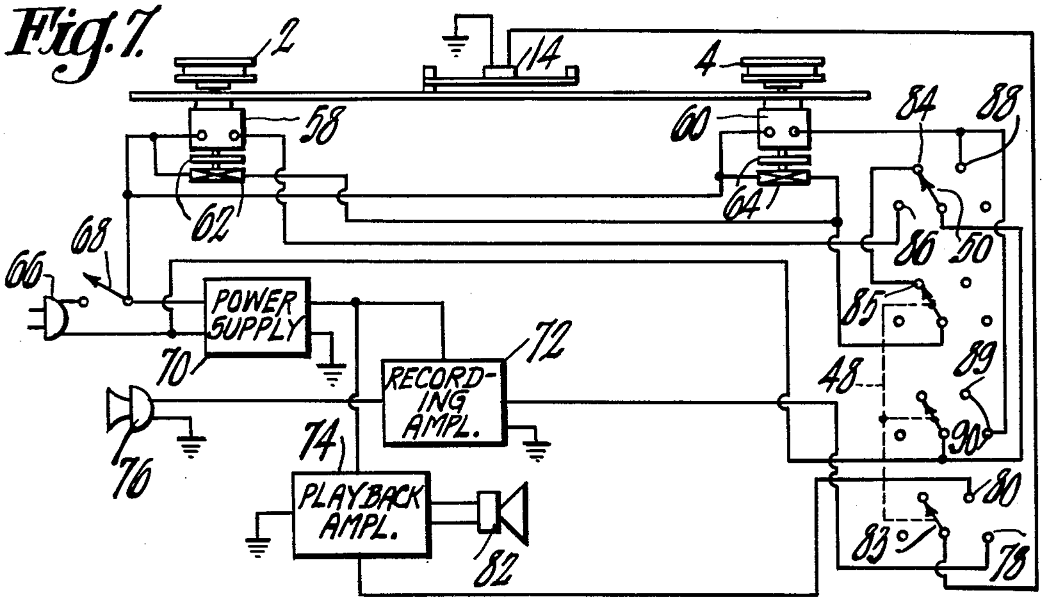
Fig. 7 is a schematic circuit diagram illustrating a switching circuit which may be incorporated in this apparatus.

Referring, now, to Fig. 7, there is shown a schematic circuit arrangement involving the apparatus thus far described and showing schematically a suitable electrical circuit coupled to the two switches 48 and 50 for effecting the desired operations indicated. The supply reel 2 is driven by a suitable electric motor 58 while the takeup reel 6 is driven by a similar motor 60. Each of these motors are arranged, when energized, to drive the associated reel in a direction to wind the tape onto such reel. A magnetic brake 62 is positioned on the shaft of the motor 58 and serves to lock the motor 58 against rotation whenever the magnetic brake is energized. A second magnetic brake 64 is similarly associated with the motor 60.

A source of electrical energy is schematically represented by a plug 66. A main power switch 68 is connected in one line leading from the plug 66. Energy from the source or plug 66 is conducted to a usual power supply circuit 70 where the line current is converted into a form which is suitable to energize electronic amplifier circuits. The output of the power supply circuit is connected and applied to a recording amplifier 72 and a reproduce or playback amplifier 74. A microphone 76 is coupled to the input of the recording amplifier and the output of the recording amplifier is connected to the extreme right hand terminal 78 of the lower deck of switch 48. The input of the playback amplifier is connected to the second terminal 80 on the switch 48. The output of the playback amplifier is connected to a loudspeaker 82. The movable contact 83 is connected to the recording-reproducing transducer 14. Thus, whenever the contact 83 is closed on terminal 80 of the switch 48, the transducer is connected in the input circuit of the playback amplifier 74, conditioning the apparatus to reproduce recorded signals. On the other hand, when the contact 83 is closed on the terminal 78, the output of the recording amplifier 72 is connected to the transducer 14, and the apparatus is conditioned to record signals supplied to the microphone 76.

The two magnetic brakes 62 and 64 are connected in series with the source of electrical energy through the terminal 84 on the switch 50 and the terminal 85 on the upper deck of switch 48. This corresponds to the stop position of the switches shown in Figs. 3, 4 and 5. Thus whenever the switches 48 and 50 are placed in the stop position, the magnetic brakes 62 and 64 are energized preventing rotation of the two reels. The showing of magnetic brakes is, of course, merely illustrative. Mechanical brakes, which are operated by the switch shaft, may be employed rather than the magnetic brakes. The motor 58, which is coupled to drive the supply reel 2, is connected to the source of electrical energy 66 through the terminal 86 of the switch 50. Whenever the switch 50 is closed on the terminal 86, the motor 58 is energized, rewinding the tape on the supply reel 2. The motor 60 is connected to the source of energy 66 through the terminal 88 of switch 50, or through the terminals 89 and 90 of the second deck of switch 48. When the switch 50 is closed on terminal 88, or the second deck of switch 48 is closed on terminals 89 or 90, the motor 60 coupled to the takeup reel 4, is energized, causing the tape to be wound onto that reel.

In this manner, it will be seen that when the arm is in the upper or "fast drive" position shown in Fig. 2, the tape is disengaged from the capstan 24. In this condition, if the switch 50 is closed on terminal 86, the motor 58 will be energized and will rewind the tape onto the supply reel 2 at a speed which is determined only by the rotational velocity of the motor 58. On the other hand, if the switch 50 is closed on contact 88, the motor 60 will be energized and the tape will be wound onto the takeup reel 4 at a speed which is determined by the rotational velocity of the motor 60.

It will be appreciated that, due to the relationship of the bifurcated key on the operating member and the tank on each of the two switches, the operating member cannot be disengaged from either of the switches until the switch has been turned to its stop position as shown in Fig. 4.

Figure 8:
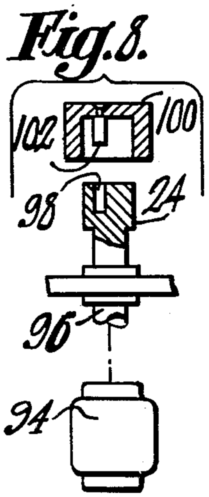
Fig. 8 is a detailed view, partly in cross section, showing means whereby the record member may be driven at either of two preselected speeds.

When the arm has been moved from the "fast driving" position to the transducing position shown in Fig. 1, the transducer 14 is brought into engagement with the tape 8 and the pressure roller 30 is brought to bear against the capstan 24. The capstan, of course, is driven at a constant speed by a suitably stabilized, constant speed motor 94 (Fig. 8). In this position of the arm 10, if the operating knob is actuated to close the second deck of switch 48 on either of contacts 89 or 90, the takeup reel motor 60 is energized. However, the takeup reel can only be driven at a speed which will take up the tape supplied from the capstan since the tape is pressed between the capstan and the pressure roller. The takeup reel motor 60 is not sufficiently powerful to overpower the capstan drive arrangement. In this condition, the velocity of the tape is controlled by the capstan. It is to be noted that the relationship of the several members associated with the operating arm 10 is such that, when the arm is in the "transducing" position and the switch 48 is turned to either "record" or "playback" position, the arm 10 will be locked in position by the engagement of the key 46 and the tank 52. However, when the switch 48 is turned to its "stop" position, the tang 52 and key 46 are aligned with the arc described by the motion of those parts about the pivot 12. In this condition, the spring 34 acts on the pressure roller 30, pressing it toward the capstan 24. Unless the operator holds the arm 10 in place, the arm, under the pressure exerted by the spring 34, will move away from the capstan. This prevents the machine from being left in an off condition with the tire 32 pressed against the capstan when such action would probably deform the pressure roller and impair its operation.

In order to enhance the versatility of this type of apparatus, means are provided for driving the tape, under the control of the capstan, at either of two predetermined linear velocities. This is accomplished by providing a capstan as shown in Fig. 8. The lower speed capstan 24 is of a predetermined diameter which when driven at a constant speed by the motor 94 through the shaft 96 will have a peripheral velocity commensurate with a standard tape velocity, such, for example as 3.75 inches per second. This capstan is provided with a recess 98 which is substantially parallel to the axis of the capstan but does not coincide with that axis. In order to drive the tape at a higher speed, a capstain cap 100 is provided which fits snugly over the outer periphery of the capstan 24. To assure that there will be no slippage between the capstan 24 and the capstan cap 100, the cap is provided with a pin 102 which is positioned to be aligned with and seated in the eccentric recess 98. The outer diameter of the cap 100 may, for example, be exactly twice that of the capstan 24. With the cap in place on the capstan, the tape will be driven at a linear velocity which is twice the velocity at which the tape is driven by the capstan without the cap. In accordance with the cited example, with the cap in place, the tape would be driven at 7.5 inches per second. It may be further noted that when the cap 100 is in place on the capstan, the larger diameter causes a greater tensioning in the spring 34 than the smaller diameter of the capstan 24 without the cap. This greater tensioning of the spring 34 causes the pressure roller 30 to exert a greater pressure on the capstan when the tape record member is being driven at the higher speed. This increased pressure is found to be helpful in assuring an intimate driving contact of the capstan with the tape record member during the higher speed operation when irregularities in the driving contact are more likely to occur.

Thus there has been provided an improved magnetic tape recorder-reproducer apparatus in which a single knob controls all of the operations and functions of the apparatus with the possible exception of the main power switch and the volume and tone control members for the amplifiers. The system herein provided is characterized in simplicity of operation and construction.

What is claimed is:

1. A magnetic recording-reproducing apparatus for use with a magnetic record member, said apparatus comprising an operating arm mounted for limited pivotal movement about a fixed pivot located adjacent one end of said arm, an operating knob carried by said arm adjacent the end remote from said pivot, said arm being movable between a first and second switching position, a first switch means engageable by said knob at said first position of said arm, a second switch means engageable by said knob at said second position of said arm, a magnetic record transducer, and means for effecting engagement between said transducer and said record member when said arm is in said first position.

2. A magnetic recording-reproducing apparatus for use with a magnetic tape record member, said apparatus comprising an operating arm mounted for limited pivotal movement about a fixed pivot adjacent to one end of said arm, an operating member carried by said arm adjacent the end remote from said pivot, said arm being movable between a first position and a second position, a first switch means positioned to be engaged by said operating member when said arm is in said first position, a second switch means positioned to be engaged by said operating member when said arm is in said second position, a magnetic record transducer, and means for effecting engagement between said transducer and said tape record member when said arm is in said first position.

3. A magnetic recording-reproducing apparatus for use with a magnetic tape record member, said apparatus comprising an operating arm mounted for limited pivotal movement about a fixed pivot, an operating handle on an end of said arm remote from said pivot, said arm being pivotally movable between a first position and a second position, said operating handle including an operating knob and a switch actuating member, a first switch means positioned to be engaged by said switch actuating member when said arm is in said first position, a second switch means positioned to be engaged by said switch actuating member when said arm is in said second position, and a magnetic record transducer mounted on and carried by said arm in a position to engage said record member when said arm is in said first position and to be disengaged from said record member when said arm is in said second position.

4. A magnetic recording-reproducing apparatus for use with a magnetic tape record member, said apparatus comprising an operating arm mounted for limited pivotal movement about a fixed pivot between a first position and a second position, an operating handle on an end of said arm remote from said pivot, said handle including an operating knob on a switch actuating member, a first switch means operatively connected to control the "record" and "reproduce" functions of the apparatus positioned to be engaged by said switch actuating member when said arm is in said first position, and a second switch means operatively connected to effect "fast forward" and "fast rewind" operations of the tape record member positioned to be engaged by said switch actuating member when said arm is in said second position.

5. A magnetic recording-reproducing apparatus for use with a magnetic record tape member, said apparatus comprising an operating arm mounted for limited pivotal movement about a fixed pivot between a first position and a second position, an operating handle on an end of said arm remote from said pivot, said handle including an operating knob and a switch actuating member, a first switch means operatively connected to control the "record" and "reproduce" function of the apparatus positioned to be engaged by said switch actuating member when said arm is in said first position, a second switch means operatively connected to effect "fast forward" and "fast rewind" operation of the tape record member positioned to be engaged by said switch actuating member when said arm is in said second position, and a magnetic record transducer mounted on and carried by said arm in a position to engage said record member when said arm is in said first position and to be disengaged from said record member when said arm is in said second position.

6. A magnetic recording-reproducing apparatus for use with a magnetic record tape member, said apparatus comprising an operating arm mounted for limited pivotal movement about a fixed pivot between a "transducing" position and a "fast driving" position, an operating handle on an end of said arm remote from said pivot, said handle including an operating knob and a switch actuating member, a first switch means positioned to be engaged by said switch actuating member when said arm is in said "transducing" position and operatively connected to control the "record" and "reproduce" functions of said apparatus, a second switch means positioned to be engaged by said switch actuating means when said arm is in said "fast driving" position and operatively connected to effect "fast forward" and "fast rewind" operations of said apparatus, a magnetic record transducer mounted on and carried by said arm in a position to engage said record member when said arm is in said "transducing" position and to be disengaged from said record member when said arm is in said "fast driving" position, a record member driving capstan positioned adjacent said "transducing" position of said arm, and means carried by said arm for effecting driving engagement of said record member with said capstan when said arm is in said "transducing" position.

7. A magnetic recording-reproducing apparatus for use with a magnetic record tape member, said apparatus comprising an operating arm mounted for limited pivotal movement about a fixed pivot between a "transducing" position and a "fast driving" position, an operating handle on an end of said arm remote from said pivot, said handle including an operating knob and a switch actuating member, a first switch means positioned to be engaged by said switch actuating member when said arm is in said "transducing" position and operatively connected to control the "record" and "reproduce" functions of said apparatus, a second switch means positioned to be engaged by said switch actuating member when said arm is in said "fast driving" position and operatively connected to effect "fast forward" and "fast rewind" of said apparatus, a magnetic record transducer mounted on and carried by said arm in a position to engage said record member when said arm is in said "transducing" position and to be disengaged from said record member when said arm is in said "fast driving" position, a record member driving capstan positioned adjacent said "transducing" position of said arm, a pressure roller mounted on said arm in a position to press said record member into driving engagement with said capstan when said arm is in said "transducing" position, and spring biasing means for urging said pressure roller toward said capstan.

8. A magnetic recording-reproducing apparatus for use with a magnetic record member, said apparatus comprising a control member, a transducer unit carried by said control member, means for movably supporting said control member whereby said member is movable between a first position with said unit in engagement with a record member and a second position with said unit disengaged from said record member, a capstan for driving said record member, means carried by said control member for effecting driving engagement between said capstan and said record member simultaneously with engagement of said unit with said record member, first and second control switches, and a switch actuating member carried by said control member, said first switch being positioned to be engaged by said switch actuating member when said control member is in said first position, said second switch being positioned to be engaged by said switch actuating member when said control member is in said second position.

9. A magnetic recording-reproducing apparatus for use with a magnetic record member, said apparatus comprising a control member mounted for movement between a first and a second switching position, switch actuating means carried by said control member, a first switch means positioned to be engaged by said switch actuating means at said first position of said control member, a second switch means positioned to be engaged by said switch actuating means at said second position of said control member, a magnetic record transducer, and means for effecting engagement of said transducer with a magnetic record member when said control member is in said first position.

10. A magnetic recording-reproducing apparatus for use with a magnetic record member, said apparatus comprising a control member mounted for movement between a first and a second switching position, switch actuating means carried by said control member, a first switch means positioned to be engaged by said switch actuating means at said first position of said control member, a second switch means positioned to be engaged by said switch actuating means at said second position of said control member, means to prevent operation of said switch actuating means between said positions of said control member, a magnetic record transducer, and means for effecting engagement of said transducer with a magnetic record member when said control member is in said first position.

No references cited.